March 6, 1951 E. A. JENSEN 2,543,973

PLURAL-FREQUENCY COUPLING UNIT

Filed June 27, 1946

INVENTOR
Evan A. Jensen
BY Thiess Olson & Mecklenburger
ATTYS.

Patented Mar. 6, 1951 2,543,973

UNITED STATES PATENT OFFICE 2,543,973

PLURAL-FREQUENCY COUPLING UNIT

Evan A. Jensen, Westchester, Ill., assignor to United Air Lines, Inc., Chicago, Ill., a corporation of Delaware Application June 27, 1946, Serial No. 679,835

6 Claims. (Cl. 178—44)

Figure 1:
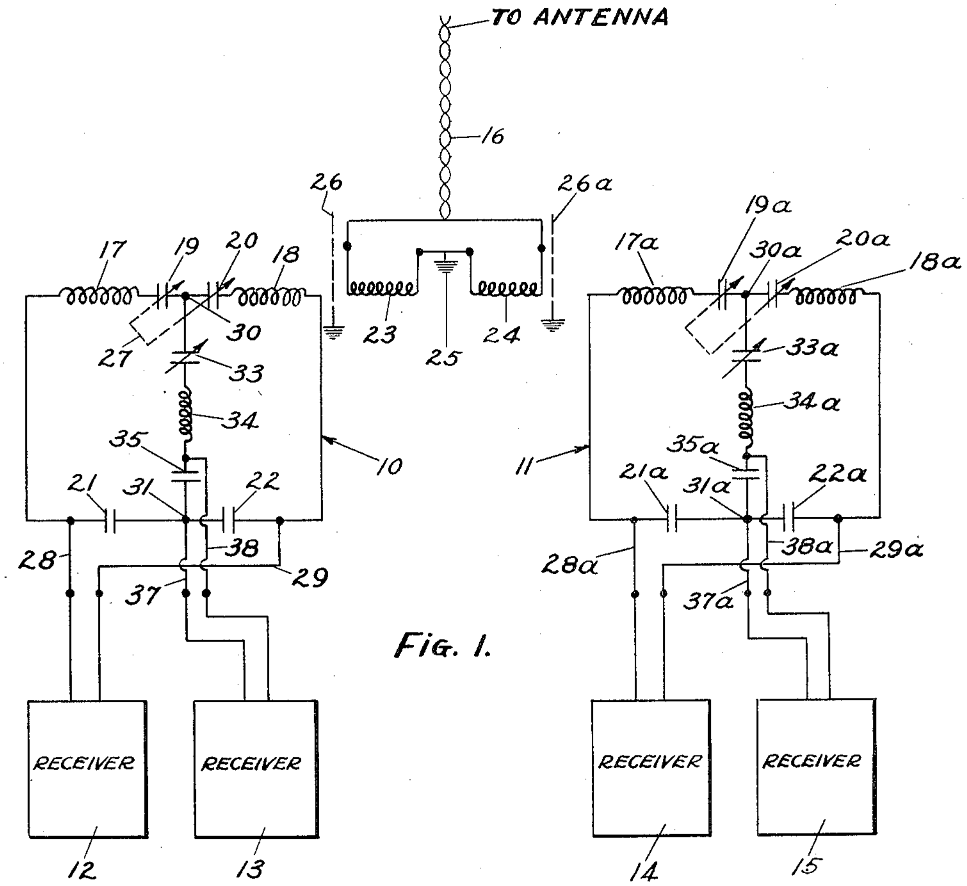

This invention relates to radio frequency coupling units, more particularly to plural-frequency coupling units for matching a plurality of circuits of one sense, such for example as output circuits, to one or more circuits of another sense, such for example as input circuits, and the invention has for an object the provision of simple and reliable coupling units of this character.

Although the invention is not limited thereto, it is particularly applicable to, and will be illustrated and described in connection with coupling units for matching a plurality of output circuits or radio receivers to a single input circuit such as an antenna or transmission line. In various radio receiver installations, particularly in ground or airborne receiver stations for aircraft radio, it is necessary, because of the limited room available for antenna structures, to connect several fixed frequency receivers to one antenna or to a single transmission line leading from the antenna. Obviously, connection of the receiver input circuits directly to the antenna transmission line without employing an impedance matching or coupling device results in a substantial loss in the gain of the receivers. Furthermore, the receiver systems, when so connected, are more vulnerable to noise pickup due to transmission line unbalance than are properly coupled receiver systems.

In spite of these disadvantages, however, such direct connections are not uncommon in practice, since at present there is no commercially available suitable coupling unit and because those coupling units which have been proposed in the literature are unsuitable due to interlocking of the tuning controls. Accordingly, it is a further object of this invention to provide a plural-frequency coupling unit for matching a plurality of differently tuned receiver or output circuits to a single antenna or input circuit without interlocking of the tuning controls.

In carrying out the invention in one form, a coupling unit is provided comprising a first matching circuit or loop which is coupled to an input circuit and to one of a plurality of differently tuned output circuits. The matching circuit is tunable to match the input and output circuits at the frequency to which the output circuit is tuned, and impedance means are connected across the matching circuit between points in the circuit that are at substantially equal potentials when the matching circuit is energized at the frequency to which it is tuned. Because of this connection, variations in the magnitude of the impedance means connected between the equalpotential points does not affect the tuning of the first matching circuit, and the impedance means together with this first matching circuit forms a second matching circuit coupled to the input circuit and which may be coupled to a second output circuit. This second matching circuit may be tuned to the frequency of the second output circuit to match the latter to the input circuit without disturbing the tuning of the first matching circuit.

Figure 2:
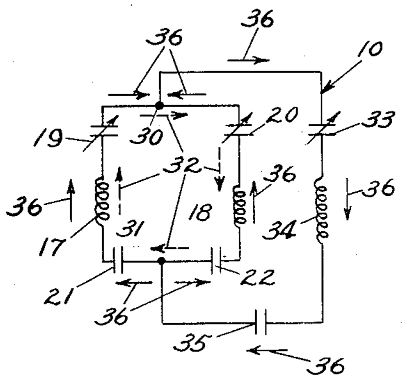

For a more complete understanding of the invention, reference may now be had to the drawing, in which:

Fig. 1 is a diagrammatic representation of a pair of coupling units embodying the invention, connected to couple a plurality of fixed tuned receiver circuits to a single input or antenna circuit; and Fig. 2 is a simplified circuit diagram of one of the coupling units shown in Fig. 1.

Referring now to the drawing, the invention is shown as embodied in a pair of coupling units 10 and 11 which are identical in construction, wherefore only one of the coupling units will be described in detail. The coupling units 10 and 11 are arranged as shown to couple four radio receivers 12, 13, 14 and 15 to a single twisted-pair transmission line 16 which leads from a suitable antenna (not shown). For purposes of explanation, it may be assumed that the receivers 12, 13, 14 and 15 are of the fixed tuned type used in aircraft communication for medium high frequency operation. In a typical installation, the receivers 12 and 14, for example, would be tuned to receiver frequencies in the aeronautical "night" band, while the receivers 13 and 15 would be tuned for operation at frequencies in the aeronautical "day" band. It will be understood, of course, that the receivers may be tuned to frequencies outside of these frequency bands and that the invention is not limited to operation at medium high frequencies.

The matching circuit for the receiver 12 is in the form of a loop and comprises a pair of inductive impedances represented by coils 17 and 18, a pair of capacitative impedances represented by adjustable condensers 19 and 20, and a pair of fixed capacitative impedances represented by condensers 21 and 22 which serve as coupling condensers for coupling the receiver or output circuit to the matching circuit. In order to couple the matching circuit to the transmission line 16, two input windings 23 and 24 are provided which are connected together and may be grounded at their midpoint, as indicated at 25, the outer terminals of these windings being connected as shown to the transmission line 16. The coil 18 in the matching circuit or loop is in inductive relation to the input winding 23 and is preferably electrostatically shielded therefrom, as by a grounded shield 26, which is diagrammatically illustrated.

Preferably, the matching circuit is tuned to the frequency of the receiver 12 prior to connection of the receiver thereto, and in order that the tuning of this first loop or matching circuit may not be disturbed when the second matching circuit, to be hereinafter described, is tuned, the various impedance elements are so chosen that the inductive impedance of the coil 18 is substantially equal to the capacitative impedance of the condensers 20 and 22 when the circuit is tuned to resonance at the selected frequency. Likewise, the inductive impedance of the coil 17 is substantially equal to the capacitative impedance of the condensers 19 and 21 when the circuit is tuned to resonance at the selected frequency, and it will be observed that the condensers 19 and 20 are connected together, as indicated by the broken line 27, so that the two halves of the loop or matching circuit may be tuned simultaneously. Furthermore, it will be observed that conductors 28 and 29, which serve to connect the receiver 12 to the loop, connect said receiver across both of the condensers 21 and 22 so as not to disturb the balance between the two halves of the loop.

Under the conditions above specified, points 30 and 31 in the matching circuit or loop will be at substantially equal potentials, and accordingly there will be a low impedance between these two points. Consequently, when the loop or matching circuit is energized at the frequency to which it is resonant, current will flow around the loop as indicated by the broken arrows 32 in Fig. 2, and any impedance which has a relatively high magnitude as compared to the impedance drop between the points 30 and 31, may be connected across the loop between these points without disturbing the tuning or having any practical effect on the current flow.

In accordance with the present invention, a second matching circuit which may be separately tuned to resonance at a different frequency in order to match the receiver 13 to the transmission line 16 for operation at the frequency to which the receiver 13 is tuned, is provided by connecting a high impedance between the points 30 and 31, which high impedance consists of an adjustable capacitative impedance represented by an adjustable condenser 33, an inductive impedance represented by a coil 34, and a fixed capacitative impedance represented by a coupling condenser 35. As shown best in Fig. 2, the condensers 33 and 35 and the coil 34, together with the first matching circuit or loop previously described, form a second matching circuit or loop consisting of a closed series circuit in which the two halves of the first loop are in parallel relation with each other.

When the condenser 33 is tuned to bring this second loop into resonance at the frequency to which the receiver 13 is tuned, currents will flow around the second matching circuit or loop at this second frequency in the manner indicated by solid line arrows 36 in Fig. 2. As shown, the receiver 13 is connected across the coupling condenser 35 by suitable conductors 37 and 38, and it will be understood that the coupling condensers 21, 22 and 35 are selected in accordance with the input impedance of the respective receivers 12 and 13, the size of the condensers determining the output impedance of the matching circuits.

It will be apparent that the order of tuning of the two matching circuits or loops is important because if the second matching circuit is tuned first by adjusting the condenser 33, any subsequent tuning of the first loop by adjusting the condensers 19 and 20 will disturb the tuning of the second loop because these condensers 19 and 20 form part of the capacitative impedance in this second matching circuit.

As previously indicated, the coupling unit 11 is identical with the coupling unit 10 and similar parts of the coupling unit 11 are identified by the same reference numerals employed in the description of the coupling unit 10 followed by the letter *a*.

It will now be apparent that coupling units embodying the invention comprise a double resonant circuit which permits the adjustment of one circuit without affecting the prior tuning of the other. Although the invention has been shown in connection with receiver circuits, it will be understood that it may be used in connection with input and output circuits of any character wherein it is desired to match a plurality of differently tuned output circuits to a single input circuit, or vice versa. Obviously, the coupling units may be employed in connection with transmitters to permit operation on a plurality of different frequencies. Likewise, if desired, the coupling unit may be employed to couple an open-wire transmission line to a coaxial or twisted-pair transmission line. In such an embodiment the open wire transmission line would be connected to the terminals of the input winding 23, for example, and the coaxial transmission line would be connected to the conductors 28 and 29 in place of the receiver 12.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. A plural-frequency coupling unit for matching a plurality of differently tuned output circuits to a single input circuit, comprising a first loop including two joined portions with a pair of connection points at their junctions, inductance and capacitance means in each of said loop portions, said inductance means in one of said portions being coupled to said input circuit, means for adjusting the capacitance means in each portion of said loop so that the capacity reactance in each portion at a first frequency substantially equals the inductive reactance in the corresponding portion at said first frequency whereby said loop is resonant at said first frequency and the impedance between said connection points is low at said first frequency, means coupling said loop to one of said output circuits to match said one output circuit to said input circuit at said first frequency, impedance means connected between said connection points and having a high impedance at said first frequency, said impedance means and said first loop forming a second loop coupled to said input circuit, said impedance means being adjustable to tune said second loop to resonance at a second frequency without disturbing the tuning of said first loop, and means coupling said second loop to another of said output circuits.

2. A plural-frequency coupling unit for matching a plurality of differently tuned output circuits to a single input circuit, comprising a first loop including two joined portions with a pair of connection points at their junction, inductance and capacitance means in each of said loop portions, said inductance means in one of said portions being coupled to said input circuit, means for adjusting the capacitance means in each portion if said loop so that the capacity reactance in each portion at a first frequency substantially equals the inductive reactance in the corresponding portion at said first frequency whereby said loop is resonant at said first frequency and the impedance between said connection points is low at said first frequency, said capacitance means in each of said portions including a coupling condenser for coupling said loop to one of said output circuits, impedance means connected between said connection points and having a high impedance at said first frequency, said impedance means and said first loop forming a second loop coupled to said input circuit through said inductance means in said one portion of said first loop, means for adjusting said impedance means to tune said second loop to resonance at a second frequency without disturbing the tuning of said first loop, said impedance means including a coupling condenser for coupling said second loop to another of said output circuits.

3. A plural-frequency coupling unit for matching a plurality of circuits of one sense operating at different frequencies to a common circuit of another sense comprising, a first circuit including inductive and capacitive components connected in a closed loop coupled to said common circuit, said inductive and capacitive components being related whereby said first circuit is tuned to resonance at a first frequency, means coupling said first circuit to one of said different-frequency circuits to match said one different-frequency circuit to said common circuit at said first frequency, impedance means nonresonant at said first frequency connected across certain of said inductive and capacitive components having low impedance thereacross when said first circuit is tuned to resonance, whereby the tuning of said first circuit is substantially unaffected by said impedance means, said impedance means and said first circuit forming a second circuit coupled to said common circuit, said impedance being related to the components of said first circuit whereby said second circuit is tuned to resonance at a second frequency without disturbing the tuning of said first circuit, and means coupling said second circuit to another of said different-frequency circuits to match said other different-frequency circuit to said common circuit at said second frequency.

4. A plural-frequency coupling unit for matching a plurality of circuits of one sense operating at different frequencies to a common circuit of another sense, comprising a first loop including two joined portions with a pair of connection points at their junctions, inductive and capacitive components in each of said loop portions, one of said loop portions being coupled to said input circuit, means for adjusting one of the inductive and capacitive means in each portion of said loop so that the capacitive reactance in each portion substantially equals the inductive reactance in the corresponding portion at a first frequency, whereby said loop is resonant at said first frequency and the impedance between said connection points is low at said first frequency, means coupling said loop to one of said different-frequency circuits to match said one different-frequency circuit to said common circuit at said first frequency, impedance means nonresonant at said first frequency connected between said connection points, said impedance means and said first loop forming a second loop coupled to said common circuit, said impedance being adjustable to tune said second loop to resonance at a second frequency without disturbing the tuning of said first loop, and means coupling said second loop to another of said different-frequency circuits to match said other different-frequency circuit to said common circuit at said second frequency.

5. A plural-frequency coupling unit for matching a plurality of differently tuned output circuits to a single input circuit, comprising a first circuit including inductive and capacitive components connected in a closed loop coupled to said common circuit, said inductive and capacitive components being related whereby said first circuit is tuned to resonance at a first frequency corresponding to the tuned frequency of one of said differently tuned output circuits, means coupling said first circuit to said one of said differently tuned output circuits to match said one differently tuned output circuit to said input circuit at said first frequency, impedance means nonresonant at said first frequency connected across certain of said inductive and capacitive components having low impedance thereacross when said first circuit is energized from said input circuit at said first frequency, whereby the tuning of said first circuit is substantially unaffected by said impedance means, said impedance means and said first circuit forming a second circuit coupled to said common circuit, said impedance means being related to the components of said first circuit whereby said second circuit is tuned to resonance at a second frequency corresponding to the tuned frequency of another of said differently tuned output circuits without disturbing the tuning of said first circuit, and means coupling said second circuit to said other of said differently tuned output circuits to match said other differently tuned output circuit to said input circuit at said second frequency.

6. A plural-frequency coupling unit for matching a plurality of differently tuned output circuits to a single input circuit, comprising a first loop including two joined portions with a pair of connection points at their junctions, inductive and capacitive means in each of said loop portions, one of said loop portions being coupled to said input circuit, means for adjusting one of the capacitive and inductive means in each portion of said loop so that the capacitive reactance in each portion substantially equals the inductive reactance in the corresponding portion at a first frequency corresponding to the tuned frequency of one of said differently tuned output circuits, whereby said loop is resonant at said first frequency and the impedance between said connection points is low at said first frequency, means coupling said loop to one of said output circuits to match said one output circuit to said input circuit at said first frequency, impedance means connected between said connection points and having high impedance at said first frequency, said impedance means and said first loop forming a second loop coupled to said input circuit, said impedance being adjustable to tune said second loop to resonance at a second frequency corresponding to the tuned frequency of another of said differently tuned output circuits without disturbing the tuning of said first loop, and means for coupling said second loop to said other of said output circuits to match said other output circuit to said common circuit at said second frequency.

EVAN A. JENSEN.

REFERENCES CITED

The following references are of record in the file of this patent:

UNITED STATES PATENTS

| Number | Name | Date |
|---|---|---|
| 2,044,047 | Bobis | June 16, 1936 |
| 2,128,400 | Carter | Aug. 30, 1938 |
| 2,238,438 | Alford | Apr. 15, 1941 |
| 2,280,282 | Colchester et al. | Apr. 21, 1942 |
| 2,371,395 | Keeling | Mar. 13, 1945 |
| 2,492,150 | Himmel | Dec. 27, 1949 |